United States Patent
McQuade et al.

(10) Patent No.: US 8,810,385 B2
(45) Date of Patent: Aug. 19, 2014

(54) SYSTEM AND METHOD TO IMPROVE THE EFFICIENCY OF VEHICLE INSPECTIONS BY ENABLING REMOTE ACTUATION OF VEHICLE COMPONENTS

(75) Inventors: Charles Michael McQuade, Issaquah, WA (US); Brett Brinton, Seattle, WA (US)

(73) Assignee: Zonar Systems, Inc., Seattle, WA (US)

( * ) Notice: Subject to any disclaimer, the term of this patent is extended or adjusted under 35 U.S.C. 154(b) by 871 days.

(21) Appl. No.: 12/881,559

(22) Filed: Sep. 14, 2010

(65) Prior Publication Data

US 2011/0022248 A1  Jan. 27, 2011

Related U.S. Application Data

(63) Continuation-in-part of application No. 12/475,309, filed on May 29, 2009, now Pat. No. 7,944,345, which is a continuation of application No. 10/915,957, filed on Aug. 11, 2004, now Pat. No. 7,557,696, which is a continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646.

(51) Int. Cl.
*B60Q 1/00* (2006.01)

(52) U.S. Cl.
USPC ........ 340/439; 340/442; 340/453; 340/539.1; 340/870.16; 340/933; 340/938; 235/380; 702/127; 702/183

(58) Field of Classification Search
USPC ......... 340/439, 442, 453, 539.1, 576, 870.16, 340/933, 938; 235/376, 380; 701/33, 35; 702/127, 183
See application file for complete search history.

(56) References Cited

U.S. PATENT DOCUMENTS

| | | | |
|---|---|---|---|
| 3,990,067 A | 11/1976 | Van Dusen et al. | 340/306 |
| 4,025,791 A | 5/1977 | Lennington et al. | 250/341 |

(Continued)

FOREIGN PATENT DOCUMENTS

| | | | |
|---|---|---|---|
| CA | 2138378 | 11/1994 | G07C 1/20 |
| CA | 2388572 | 5/2001 | G06F 17/60 |

(Continued)

OTHER PUBLICATIONS

Albright, B., "Indiana Embarks on Ambitious RFID roll out." *Frontline Solutions*. May 20, 2002; 2pp. Available at: <http://www.frontlinetoday.com/frontline/article/articleDetail.jsp?id=19358>.

(Continued)

*Primary Examiner* — Hung T. Nguyen
(74) *Attorney, Agent, or Firm* — Michael C. King

(57) ABSTRACT

A handheld, portable device is used to facilitate inspection of vehicles, by wirelessly conveying an activation command to the vehicle to actuate a vehicle component, to facilitate inspection of the actuated component. The activation command is received by a wireless data link in the vehicle, which is electrically/logically coupled to either a switch that controls actuation of the component, an actuator configured to manipulate the component, and/or a vehicle processor configured to selectively convey an actuation command to the component. In some embodiments, in response to conveying the activation command, the handheld device enables the user to input a condition of the actuated component, which is added to an inspection record. In some embodiments, the handheld device sends a query to the vehicle, which results in the handheld device providing an indication to a user of each component in the vehicle that is capable of remote actuation.

18 Claims, 6 Drawing Sheets

(56) References Cited

U.S. PATENT DOCUMENTS

| | | | | |
|---|---|---|---|---|
| 4,092,718 | A | 5/1978 | Wendt | 364/436 |
| 4,258,421 | A | 3/1981 | Juhasz et al. | 364/424 |
| 4,263,945 | A | 4/1981 | Van Ness | 141/98 |
| 4,325,057 | A | 4/1982 | Bishop | 340/539 |
| 4,469,149 | A | 9/1984 | Walkey et al. | 141/94 |
| 4,602,127 | A | 7/1986 | Neely et al. | 379/68 |
| 4,658,371 | A | 4/1987 | Walsh et al. | 364/550 |
| 4,763,356 | A | 8/1988 | Day, Jr. et al. | 379/368 |
| 4,799,162 | A | 1/1989 | Shinakawa et al. | 364/436 |
| 4,804,937 | A | 2/1989 | Barbiaux et al. | 340/52 F |
| 4,846,233 | A | 7/1989 | Fockens | 141/94 |
| 4,897,792 | A | 1/1990 | Hosoi | 364/449 |
| 4,934,419 | A | 6/1990 | Lamont et al. | 141/94 |
| 4,935,195 | A | 6/1990 | Palusamy et al. | 376/249 |
| 5,058,044 | A | 10/1991 | Stewart et al. | 364/551.01 |
| 5,068,656 | A | 11/1991 | Sutherland | 340/989 |
| 5,072,380 | A | 12/1991 | Randelman et al. | 364/406 |
| 5,120,942 | A | 6/1992 | Holland | 235/376 |
| 5,128,651 | A | 7/1992 | Heckart | 340/433 |
| 5,204,819 | A | 4/1993 | Ryan | 364/465 |
| 5,206,643 | A | 4/1993 | Eckelt | 340/932.2 |
| 5,223,844 | A | 6/1993 | Mansell et al. | 342/357.07 |
| 5,243,323 | A | 9/1993 | Rogers | 340/433 |
| 5,321,629 | A | 6/1994 | Shirata et al. | 702/187 |
| 5,337,003 | A | 8/1994 | Carmichael et al. | 324/402 |
| 5,359,522 | A | 10/1994 | Ryan | 364/465 |
| 5,394,136 | A | 2/1995 | Lammers et al. | 340/439 |
| 5,399,844 | A | 3/1995 | Holland | 235/376 |
| 5,442,553 | A | 8/1995 | Parrillo | 364/424.04 |
| 5,459,304 | A | 10/1995 | Eisenmann | 235/380 |
| 5,459,660 | A | 10/1995 | Berra | 701/33 |
| 5,479,479 | A | 12/1995 | Braitberg et al. | 379/58 |
| 5,488,352 | A | 1/1996 | Jasper | 340/431 |
| 5,499,182 | A | 3/1996 | Ousborne | 364/424.04 |
| 5,541,845 | A | 7/1996 | Klein | 364/449 |
| 5,546,305 | A | 8/1996 | Kondo | 364/424.03 |
| 5,557,254 | A | 9/1996 | Johnson et al. | 340/426 |
| 5,557,268 | A | 9/1996 | Hughes et al. | 340/933 |
| 5,572,192 | A | 11/1996 | Berube | 340/574 |
| 5,585,552 | A | 12/1996 | Heuston et al. | 73/116 |
| 5,594,650 | A | 1/1997 | Shah et al. | 364/449.1 |
| 5,596,501 | A | 1/1997 | Comer et al. | 364/464.23 |
| 5,600,323 | A | 2/1997 | Boschini | 341/173 |
| 5,610,596 | A | 3/1997 | Petitclerc | 340/825.23 |
| 5,623,258 | A | 4/1997 | Dorfman | 340/825.08 |
| 5,629,678 | A | 5/1997 | Gargano et al. | 340/573.4 |
| 5,671,158 | A | 9/1997 | Fournier et al. | 345/8 |
| 5,680,328 | A | 10/1997 | Skorupski et al. | 364/550 |
| 5,719,771 | A | 2/1998 | Buck et al. | 364/443 |
| 5,731,893 | A | 3/1998 | Dominique | 359/379 |
| 5,732,074 | A | 3/1998 | Spaur et al. | 370/313 |
| 5,742,915 | A | 4/1998 | Stafford | 701/35 |
| 5,745,049 | A | 4/1998 | Akiyama et al. | 340/870.17 |
| 5,758,299 | A | 5/1998 | Sandborg et al. | 701/29 |
| 5,758,300 | A | 5/1998 | Abe | 701/33 |
| 5,781,871 | A | 7/1998 | Mezger et al. | 701/33 |
| 5,794,164 | A | 8/1998 | Beckert et al. | 701/1 |
| 5,808,565 | A | 9/1998 | Matta et al. | 340/994 |
| 5,809,437 | A | 9/1998 | Breed | 701/29 |
| 5,815,071 | A | 9/1998 | Doyle | 340/439 |
| 5,835,871 | A | 11/1998 | Smith et al. | 701/29 |
| 5,838,251 | A | 11/1998 | Brinkmeyer et al. | 340/825.31 |
| 5,839,112 | A | 11/1998 | Schreitmueller et al. | 705/4 |
| 5,850,187 | A * | 12/1998 | Carrender et al. | 340/10.6 |
| 5,867,404 | A | 2/1999 | Bryan | 364/550 |
| 5,874,891 | A | 2/1999 | Lowe | 340/433 |
| 5,884,202 | A | 3/1999 | Arjomand | 701/29 |
| 5,890,061 | A | 3/1999 | Timm et al. | 455/404 |
| 5,890,520 | A | 4/1999 | Johnson, Jr. | 141/94 |
| 5,913,180 | A | 6/1999 | Ryan | 702/45 |
| 5,922,037 | A | 7/1999 | Potts | 701/29 |
| 5,923,572 | A | 7/1999 | Pollock | 364/528.17 |
| 5,942,753 | A | 8/1999 | Dell | 250/338.1 |
| 5,956,259 | A | 9/1999 | Hartsell, Jr. et al. | 364/528.37 |
| 5,995,898 | A | 11/1999 | Tuttle | 701/102 |
| 6,009,355 | A | 12/1999 | Obradovich et al. | 701/1 |
| 6,009,363 | A | 12/1999 | Beckert et al. | 701/33 |
| 6,016,795 | A | 1/2000 | Ohki | 123/681 |
| 6,024,142 | A | 2/2000 | Bates | 141/94 |
| 6,025,776 | A | 2/2000 | Matsuura | 340/438 |
| 6,043,661 | A | 3/2000 | Gutierrez | 324/504 |
| 6,054,950 | A | 4/2000 | Fontana | 342/463 |
| 6,061,614 | A | 5/2000 | Carrender et al. | 701/33 |
| 6,064,299 | A | 5/2000 | Lesesky et al. | 340/431 |
| 6,070,156 | A | 5/2000 | Hartsell, Jr. | 705/413 |
| 6,078,255 | A | 6/2000 | Dividock et al. | 340/539 |
| 6,084,870 | A | 7/2000 | Wooten et al. | 370/349 |
| 6,092,021 | A | 7/2000 | Ehlbeck et al. | 701/123 |
| 6,107,915 | A | 8/2000 | Reavell et al. | 340/433 |
| 6,107,917 | A | 8/2000 | Carrender et al. | 340/505 |
| 6,112,152 | A | 8/2000 | Tuttle | 701/115 |
| 6,127,947 | A | 10/2000 | Uchida et al. | 340/999 |
| 6,128,551 | A | 10/2000 | Davis et al. | 700/236 |
| 6,128,959 | A | 10/2000 | McGovern et al. | 73/660 |
| 6,169,938 | B1 | 1/2001 | Hartsell, Jr. | 700/302 |
| 6,169,943 | B1 | 1/2001 | Simon et al. | 701/29 |
| 6,199,099 | B1 | 3/2001 | Gershman et al. | 709/203 |
| 6,202,008 | B1 | 3/2001 | Beckert et al. | 701/33 |
| 6,208,948 | B1 | 3/2001 | Klingler et al. | 702/183 |
| 6,236,911 | B1 | 5/2001 | Kruger | 701/1 |
| 6,240,365 | B1 | 5/2001 | Bunn | 701/213 |
| 6,253,129 | B1 | 6/2001 | Jenkins et al. | 701/29 |
| 6,256,579 | B1 | 7/2001 | Tanimoto | 701/201 |
| 6,259,358 | B1 | 7/2001 | Fjordbotten | 340/433 |
| 6,263,273 | B1 | 7/2001 | Henneken et al. | 701/51 |
| 6,263,276 | B1 | 7/2001 | Yokoyama et al. | 701/207 |
| 6,278,936 | B1 | 8/2001 | Jones | 701/201 |
| 6,285,953 | B1 | 9/2001 | Harrison et al. | 701/213 |
| 6,295,492 | B1 | 9/2001 | Lang et al. | 701/33 |
| 6,330,499 | B1 | 12/2001 | Chou et al. | 701/33 |
| 6,339,745 | B1 | 1/2002 | Novik | 701/208 |
| 6,362,730 | B2 | 3/2002 | Razavi et al. | 340/438 |
| 6,370,454 | B1 | 4/2002 | Moore | 701/29 |
| 6,374,176 | B1 | 4/2002 | Schmier et al. | 701/200 |
| 6,396,413 | B2 | 5/2002 | Hines et al. | 340/825.49 |
| 6,411,203 | B1 | 6/2002 | Lesesky et al. | 340/431 |
| 6,411,891 | B1 | 6/2002 | Jones | 701/201 |
| 6,417,760 | B1 | 7/2002 | Mabuchi et al. | 340/5.3 |
| 6,438,472 | B1 | 8/2002 | Tano et al. | 701/35 |
| 6,450,411 | B1 | 9/2002 | Rash et al. | 236/44 A |
| 6,456,039 | B1 | 9/2002 | Lauper et al. | 320/107 |
| 6,502,030 | B2 | 12/2002 | Hilleary | 701/207 |
| 6,505,106 | B1 | 1/2003 | Lawrence | 701/35 |
| 6,507,810 | B2 | 1/2003 | Razavi et al. | 703/24 |
| 6,529,723 | B1 | 3/2003 | Bentley | 455/405 |
| 6,529,808 | B1 | 3/2003 | Diem | 701/29 |
| 6,539,296 | B2 | 3/2003 | Diaz et al. | 701/33 |
| 6,571,617 | B2 * | 6/2003 | Van Niekerk et al. | 73/146 |
| 6,587,768 | B2 | 7/2003 | Chen et al. | 701/33 |
| 6,594,579 | B1 | 7/2003 | Lowrey et al. | 701/123 |
| 6,594,621 | B1 | 7/2003 | Meeker | 702/185 |
| 6,597,973 | B1 | 7/2003 | Barich et al. | 701/29 |
| 6,604,033 | B1 | 8/2003 | Banet et al. | 701/33 |
| 6,608,554 | B2 | 8/2003 | Lesesky et al. | 340/431 |
| 6,609,082 | B2 | 8/2003 | Wagner | 702/182 |
| 6,611,740 | B2 | 8/2003 | Lowrey et al. | 701/29 |
| 6,614,392 | B2 | 9/2003 | Howard | 342/357.07 |
| 6,616,036 | B2 | 9/2003 | Streicher et al. | 235/381 |
| 6,621,452 | B2 | 9/2003 | Knockeart et al. | 342/357.09 |
| 6,636,790 | B1 | 10/2003 | Lightner et al. | 701/33 |
| 6,664,897 | B2 | 12/2003 | Pape et al. | 340/573.3 |
| 6,671,646 | B2 | 12/2003 | Manegold et al. | 702/127 |
| 6,680,694 | B1 | 1/2004 | Knockeart et al. | 342/357.09 |
| 6,708,113 | B1 | 3/2004 | Von Gerlach et al. | 701/210 |
| 6,714,859 | B2 | 3/2004 | Jones | 701/201 |
| 6,727,818 | B1 | 4/2004 | Wildman et al. | 340/573.1 |
| 6,732,031 | B1 | 5/2004 | Lightner et al. | 701/33 |
| 6,732,032 | B1 | 5/2004 | Banet et al. | 701/33 |
| 6,744,352 | B2 | 6/2004 | Lesesky et al. | 340/431 |
| 6,754,183 | B1 | 6/2004 | Razavi et al. | 370/254 |
| 6,768,994 | B1 | 7/2004 | Howard et al. | 707/10 |
| 6,801,841 | B2 | 10/2004 | Tabe | 701/29 |
| 6,804,606 | B2 | 10/2004 | Jones | 701/213 |
| 6,804,626 | B2 | 10/2004 | Manegold et al. | 702/182 |

(56) References Cited

U.S. PATENT DOCUMENTS

| | | | |
|---|---|---|---|
| 6,816,762 B2 | 11/2004 | Hensey et al. | 701/35 |
| 6,834,259 B1 | 12/2004 | Markwitz et al. | 702/187 |
| 6,856,820 B1 | 2/2005 | Kolls | 455/575.9 |
| 6,876,642 B1 | 4/2005 | Adams et al. | 370/338 |
| 6,879,894 B1 | 4/2005 | Lightner et al. | 701/33 |
| 6,880,390 B2 | 4/2005 | Emord | 701/103 |
| 6,894,617 B2 | 5/2005 | Richman | 340/573.1 |
| 6,899,151 B1 | 5/2005 | Latka et al. | 141/392 |
| 6,904,359 B2 | 6/2005 | Jones | 701/204 |
| 6,909,947 B2 | 6/2005 | Douros et al. | 701/29 |
| 6,924,750 B2 | 8/2005 | Flick | 340/989 |
| 6,928,348 B1 | 8/2005 | Lightner et al. | 701/33 |
| 6,946,953 B2 | 9/2005 | Lesesky et al. | 340/431 |
| 6,952,645 B1 | 10/2005 | Jones | 701/201 |
| 6,954,689 B2 | 10/2005 | Hanson et al. | 701/33 |
| 6,957,133 B1 | 10/2005 | Hunt et al. | 701/29 |
| 6,972,668 B2 | 12/2005 | Schauble | 340/438 |
| 6,988,033 B1 | 1/2006 | Lowrey et al. | 701/123 |
| 7,022,018 B2 | 4/2006 | Koga | 464/52 |
| 7,027,955 B2 | 4/2006 | Markwitz et al. | 702/187 |
| 7,048,185 B2 | 5/2006 | Hart et al. | 235/384 |
| 7,068,301 B2 | 6/2006 | Thompson | 348/141 |
| 7,103,460 B1 | 9/2006 | Breed | 701/29 |
| 7,113,127 B1 | 9/2006 | Banet et al. | 342/357.09 |
| 7,117,121 B2 | 10/2006 | Brinton et al. | 702/182 |
| 7,155,199 B2 | 12/2006 | Zalewski et al. | 455/403 |
| 7,171,372 B2 | 1/2007 | Daniel et al. | 705/8 |
| 7,174,243 B1 | 2/2007 | Lightner et al. | 701/33 |
| 7,174,277 B2 | 2/2007 | Vock et al. | 702/188 |
| 7,225,065 B1 | 5/2007 | Hunt et al. | 701/29 |
| 7,228,211 B1 | 6/2007 | Lowrey et al. | 701/29 |
| 7,254,516 B2 | 8/2007 | Case, Jr. et al. | 702/182 |
| 7,343,252 B2 | 3/2008 | Wiens | 702/54 |
| 7,362,229 B2 | 4/2008 | Brinton et al. | 340/572.1 |
| 7,447,574 B1 | 11/2008 | Washicko et al. | 701/29 |
| 7,477,968 B1 | 1/2009 | Lowrey et al. | 701/29 |
| 7,480,551 B1 | 1/2009 | Lowrey et al. | 701/29 |
| 7,523,159 B1 | 4/2009 | Williams et al. | 709/203 |
| 7,532,962 B1 | 5/2009 | Lowrey et al. | 701/29 |
| 7,532,963 B1 | 5/2009 | Lowrey et al. | 701/29 |
| 7,596,437 B1 | 9/2009 | Hunt et al. | 701/29 |
| 7,604,169 B2 | 10/2009 | Demere | 235/384 |
| 7,627,546 B2 | 12/2009 | Moser et al. | 707/1 |
| 7,640,185 B1 | 12/2009 | Giordano et al. | 705/23 |
| 7,650,210 B2 | 1/2010 | Breed | 701/29 |
| 7,672,756 B2 | 3/2010 | Breed | 701/29 |
| 7,672,763 B1 | 3/2010 | Hunt et al. | 701/29 |
| 7,778,752 B1 | 8/2010 | Hunt et al. | 701/36 |
| 7,783,507 B2 | 8/2010 | Schick et al. | 705/1 |
| 2001/0047283 A1 | 11/2001 | Melick et al. | 705/8 |
| 2001/0053983 A1 | 12/2001 | Reichwein et al. | 705/1 |
| 2002/0016655 A1 | 2/2002 | Joao | 701/35 |
| 2002/0022979 A1 | 2/2002 | Whipp et al. | 705/5 |
| 2002/0107833 A1 | 8/2002 | Kerkinni | 707/104.1 |
| 2002/0107873 A1 | 8/2002 | Winkler et al. | 707/1 |
| 2002/0111725 A1 | 8/2002 | Burge | 701/4 |
| 2002/0133275 A1 | 9/2002 | Thibault | 701/35 |
| 2002/0150050 A1 | 10/2002 | Nathanson | 709/226 |
| 2002/0178147 A1 | 11/2002 | Arroyo et al. | 707/2 |
| 2003/0030550 A1 | 2/2003 | Talbot | 340/433 |
| 2003/0120745 A1 | 6/2003 | Katagishi et al. | 709/217 |
| 2004/0236596 A1 | 11/2004 | Chowdhary et al. | 705/1 |
| 2005/0273250 A1 | 12/2005 | Hamilton et al. | 701/200 |
| 2006/0232406 A1 | 10/2006 | Filibeck | 340/572.1 |
| 2007/0050193 A1 | 3/2007 | Larson | 705/1 |
| 2007/0069947 A1 | 3/2007 | Banet et al. | 342/357.09 |
| 2007/0179709 A1 | 8/2007 | Doyle | 701/209 |
| 2008/0154489 A1 | 6/2008 | Kaneda et al. | 701/201 |
| 2008/0154712 A1 | 6/2008 | Wellman | 705/11 |
| 2008/0319665 A1 | 12/2008 | Berkobin et al. | 701/213 |
| 2009/0069999 A1 | 3/2009 | Bos | 701/102 |
| 2009/0177350 A1 | 7/2009 | Williams et al. | 701/29 |
| 2009/0222200 A1 | 9/2009 | Link, II et al. | 701/202 |
| 2010/0088127 A1 | 4/2010 | Betancourt et al. | 705/5 |

FOREIGN PATENT DOCUMENTS

| | | | |
|---|---|---|---|
| CA | 2326892 | 6/2005 | G07C 1/20 |
| EP | 0 755 039 | 6/1996 | G08G 1/01 |
| EP | 0 814 447 | 5/1997 | G08G 1/0968 |
| EP | 1 067 498 | 7/2000 | G08G 1/127 |
| EP | 1 271 374 | 6/2002 | G06F 17/60 |
| EP | 0 926 020 | 9/2002 | B60R 25/00 |
| EP | 1 005 627 | 10/2003 | G01C 21/00 |
| EP | 1 027 792 | 1/2004 | H04L 29/06 |
| EP | 2 116 968 | 11/2009 | G06Q 30/00 |
| WO | WO 97/26750 | 7/1997 | H04M 11/00 |
| WO | WO 98/03952 | 1/1998 | G08G 1/127 |
| WO | WO 98/30920 | 7/1998 | |
| WO | WO 03/023550 | 3/2003 | |
| WO | WO 2007/092711 | 8/2007 | |

OTHER PUBLICATIONS

Anonymous, "Transit agency builds GIS to plan bus routes." *American City & County*. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

"Detex Announces the Latest Innovation in Guard Tour Verification Technology." *DETEX Life Safety, Security and Security Assurance*. Jan. 1, 2003. 1pp. © 2002-2004 Detex Corporation. <http://www.detex.com/NewsAction.jspa?id=3>.

"D.O.T. Driver Vehicle Inspection Reports on your wireless phone!" *FleeTTrakkeR $_{LLC}$ 2002-2003 FleeTTrakkeR $_{LLC}$*. All rights reserved <http://www._fleettrakker.com/web/index.jsp> Accessed Mar. 12, 2004.

Dwyer et al., Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Guensler et al., "Development of a Comprehensive Vehicle Instrumentation Package for Monitoring Individual Tripmaking Behavior." *Georgia Institute of Technology: School of Civil and Environmental Engineering*: 31pp., Feb. 1999.

Jenkins et al., "Real-Time Vehicle Performance Monitoring Using Wireless Networking " *IASTED International Conference on Communications, Internet, and Information Technology*: 375-380, Nov. 22-24, 2004.

Kurtz, J., "Indiana's E-Government: A Story Behind It's Ranking." *INCONTEXT Indiana;s Workforce and Economy*. Jan.-Feb. 2003 vol. 4, No. 5pp. Available at <http://www.incontext.indiana.edu/2003/jan-feb03/governement.html>.

Kwon, W., "Networking Technologies of In-Vehicle." *Seoul National University: School of electrical engineering*: 44pp., Mar. 8, 2000.

Leavitt, Wendy., "The Convergence Zone." *FleetOwner*, 4pp. <www.driversmag.com/ar/fleet_convergence_zone/index.html> 1998.

Miras. "About SPS Technologies." 1pg., May 7, 1999.

Miras. "How Miras Works." 1pg., Apr. 29, 1999.

Miras. "Miras 4.0 Screenshot." 1pg., May 7, 1999.

Miras. "Miras Unit." 1pg., May 4, 1999.

Miras. "Monitoring Vehicle Functions." 1pg., Apr. 27, 1999.

Miras. "Remote Control." 1pg., Apr. 29, 1999.

Miras. "Tracking & Monitoring Software." 1pg., Apr. 29, 1999.

"Nextel, Motorola and Symbol Technologies Offer First Wireless Bar Code Scanner for Mobile Phones." Jun. 11, 2003. <http://theautochannel.com/news/2003/06/11/162927.htm>.

"OBD Up." *Motor*: 28-34, Jul. 1998.

Quaan et al., "Guard Tour Systems." *Security Management Online*. Sep. 16, 2003. 1pg. © 2000 <http://www.securitymanagement.com/ubb/Forum30/HTML/000066.html>.

Qualcomm. "Object FX Integrates TrackingAdvisor with Qualcomm's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

(56) References Cited

OTHER PUBLICATIONS

Senger, N., "Inside RF/ID: Carving a Niche Beyond Asset Tracking" *Business Solutions*. Feb. 1999: 5pp. Available at: <http://www.businesssolutionsmag.com/Articles/1999_02/990208.html>.

Sterzbach et al., "A Mobile Vehicle On-Board Computing and Communication System." *Comput. & Graphics*, vol. 20, No. 4: 659-667, 1996.

"The Data Acquisition Unit Escorte." The Proxi Escort.com. Nov. 20, 2001. 4pp. Copyright © 2000 GCS General Control Systems. <http://www.gcs.at/eng/produkte/hw/escorte.htm>.

"The PenMaster" and "The PSION Workabout." Copyright 2000 GCS General Control Systems. <http://www.gcs.at/eng/produkte/hw/penmaster.htm>.

Tiscor: The Mobile Software Solutions Provider. *Inspection Manager: An Introduction*. Sep. 27, 2004. Slide presentation; 19pp. Available: www.TISCOR.com.

Tiscor: Inspection Manager 6.0 User Guide. USA; 2004. 1-73.

"Tracking out of route: software helps fleets compare planned routes to actual miles. (TECHNOLOGY)." *Commercial Carrier Journal*. Published Oct. 1, 2005. 4pp. NDN-219-1054-1717-0.

Tsakiri et al., Abstract: "Urban fleet monitoring with GPS and GLONASS." *Journal of Navigation*, vol. 51, No. 3. Published Sep. 1998. 2pp. NDN-174-0609-4097-3.

Tuttle, J., "Digital RF/ID Enhances GPS" Proceedings of the Second Annual Wireless Symposium, pp. 406-411, Feb. 15-18, 1994, Santa Clara, CA.

Want, R., "RFID a Key to Automating Everything." *Scientific American*, Jan. 2004, p. 58-65.

"What is the Child Check-Mate Safety System"? *2002 © Child Checkmate Systems Inc.* <http://www.childcheckmate.com/what.html>.

Zujkowski, Stephen. "Savi Technolgy, Inc.: Savi Security and Productivity Systems." *ATA Security Forum 2002*, Chicago, IL: 21pp., May 15, 2002.

n.a., "Private fleets moving to wireless communications." *FleetOwner*, 4pp. <www.driversmag.com/ar/fleet_private_fleets_moving/index.html> 1997.

n.a., "MIRAS GPS vehicle tracking using the Internet." *Business Wire*, 2pp., Nov. 22, 1996.

\* cited by examiner

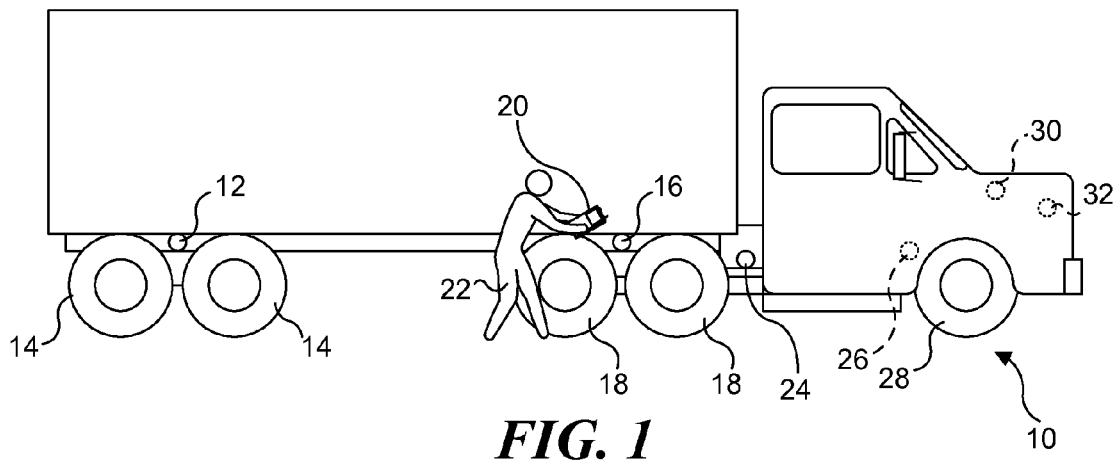
FIG. 1
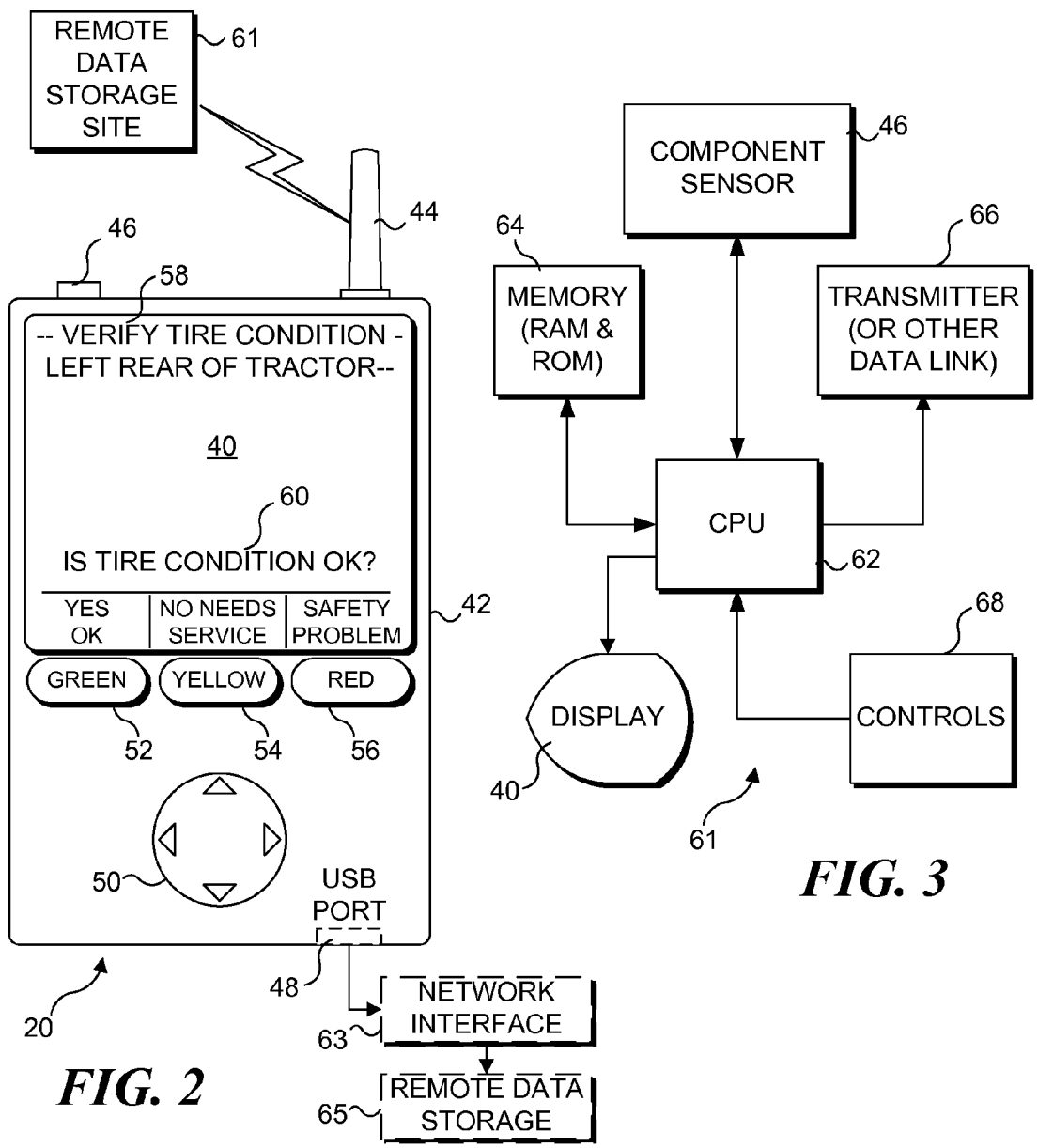
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____

☐ CONDITION OF THE ABOVE VEHICLE IS SATISFACTORY

DRIVER'S SIGNATURE: _____

☐ ABOVE DEFECTS CORRECTED
☐ ABOVE DEFECTS NEED NOT BE CORRECTED FOR SAFE OPERATION OF VEHICLE
MECHANIC'S SIGNATURE: _____ DATE: _____

DRIVER'S SIGNATURE: _____ DATE: _____

*FIG. 7 (PRIOR ART)*

SYSTEM AND METHOD TO IMPROVE THE EFFICIENCY OF VEHICLE INSPECTIONS BY ENABLING REMOTE ACTUATION OF VEHICLE COMPONENTS

RELATED APPLICATIONS

This application is a continuation-in-part of prior application Ser. No. 12/475,309, filed on May 29, 2009, now issued as U.S. Pat. No. 7,944,345 which itself is a continuation of a patent application Ser. No. 10/915,957, filed on Aug. 11, 2004 and now issued as U.S. Pat. No. 7,557,696, which itself is a continuation-in-part of prior application Ser. No. 10/219,892, filed on Aug. 15, 2002 and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. §120.

BACKGROUND

It is widely accepted that a significant reduction in accidents involving commercial trucks and trailers is likely to be achieved by ensuring that key components of such equipment are inspected on a regular basis. Such inspections can detect worn tires and brakes before they cause an accident.

To avoid accidents caused by defective equipment, Federal law presently requires that commercial drivers make a visual inspection of specific components on any type of vehicle which has a gross vehicle weight rating (GVWR) of 26,001 lb (11,793 kg) or more. Components for which inspection is required include the brake system, fuel system, warning lights, tires, etc. An exemplary vehicle inspection report listing the components and systems that must be inspected by a driver to satisfy the DOT regulations is illustrated in FIG. 7. However, under the current system, a driver is only required to fill out a paper log and keep it on file for 90 days. Many experts report that less than half of the drivers ever perform the check. Instead, many drivers simply fill out the report while seated in the cab of the truck or in a coffee shop. The report is meaningless unless the listed components and systems have actually been inspected. For example, a driver who fails to actually inspect components on his vehicle will fail to detect that brake fluid is leaking from a hydraulic master brake cylinder. As a result, the brakes on the driver's truck may fail, potentially causing a serious accident.

It would be desirable to provide method and apparatus to facilitate performing such important vehicle inspections.

SUMMARY

This application specifically incorporates herein by reference the disclosures and drawings of each patent application and issued patent that is identified above as a related application.

Disclosed herein are a method and apparatus for enabling vehicle inspections to be performed more effectively. An operator uses a handheld device while performing the inspection. The handheld device records data relevant to the inspection that can be used as a record to verify that the inspection was performed. Significantly, the method and apparatus disclosed herein enhance vehicle inspections because the handheld device includes a wireless data link configured to communicate with the vehicle being inspected, to remotely actuate one or more of the vehicle components to be inspected. In an exemplary, but not limiting embodiment, the handheld device wirelessly communicates with an onboard processor disposed in the vehicle that controls various vehicular components. The handheld device can be used to selectively activate one or more of these components, enabling the operator performing the inspection to more readily verify the condition of the component that is thus activated.

In an exemplary, but not limiting embodiment, the handheld device is configured to remotely activate the vehicle's turn signals. In the prior art, to verify that the turn signals in a vehicle were operating correctly, an inspection required two different people. One person was needed in the vehicle to manually activate the turn signals, while the other person stayed outside the vehicle in a position suitable to view the turn signals operate when the first person activated the turn signals. The concepts disclosed herein enable a single operator to perform a similar inspection by eliminating the need for a second person in the vehicle to activate the component. In an exemplary embodiment, the operator uses the handheld device to communicate with a processor in the vehicle that can actuate the turn signals. In response to a query or signal from the handheld device, the vehicle processor actuates the turn signals, enabling the operator using the handheld device to observe the performance of the turn signals. This concept can be applied to enable the functionality of other vehicle components to be inspected, as well. Such additional components can include, without limitation, brake lights, headlights, running lights, a vehicular horn, and ancillary equipment such as hoists, lift gates, pumps, bucket loaders, and loading arms.

Many vehicles include components (such as headlights and turn signals) that are actuated when an operator manipulates a switch to produce or control an electrical signal that is conveyed to a processor in the vehicle. In response to this signal, the processor sends an activation signal to (or directly activates) the component. The concepts disclosed herein replace the signal conveyed from a user input device in the vehicle to the vehicle processor, with a wireless signal sent from the handheld device this is used in connection with conducting the vehicle inspection. If the vehicle does not already include a wireless data link enabling the vehicle processor to receive a wireless signal from the handheld device external to the vehicle, then such a wireless data link is added to the vehicle, and is logically coupled to the vehicle processor used to control the vehicle components so that such components can be remotely activated by the handheld device. It should be noted that some vehicles may include more than one processor that can be used to actuate vehicle components, and providing each such processor with the ability to receive an activation signal from a external handheld device used to conduct the vehicle inspection will enable the components controlled by each different vehicle processor to be remotely actuated using the handheld device that is used to conduct the inspection.

Some vehicles may include one or more components that are not configured to be actuated by a vehicle processor, but rather are hardwired to a user input device (such as a button or switch) in the vehicle. Such components can be considered to be legacy components. The concepts disclosed herein encompass modifying such legacy components to enable them to be remotely actuated by the handheld device used to conduct a vehicle inspection. In an exemplary, but not limiting embodiment, such legacy components are modified to enable them to be activated by a vehicle processor logically coupled to a wireless data link, to receive and respond to a wireless signal from the handheld device used to perform the vehicle inspection. In another exemplary, but not limiting embodiment, such legacy components are modified by logically coupling them to a wireless data link, to receive a signal from the handheld device used to perform the vehicle inspection (it should be noted that multiple legacy components can be coupled to a common wireless data link, or one or more legacy components can each be provided a dedicated wireless data link). In another exemplary, but not limiting embodiment, the vehicle is modified to add an actuator (such as a solenoid or servo) that is coupled to a legacy component, to enable the legacy component to be remotely actuated by the handheld device used to perform the vehicle inspection. The actuator can be logically coupled to a vehicle processor that itself is coupled to a wireless data link to receive an actuation signal from the handheld device, or the actuator can itself be logically coupled to a wireless data link used to receive an actuation signal from the handheld device used to perform the vehicle inspection.

In an exemplary, but not limiting embodiment, in addition to enabling vehicle components to be remotely actuated, the handheld device provides a record indicating that a location or component of a vehicle or other type of apparatus or system was visited during an inspection. In such an embodiment, the portable device (i.e., the handheld device) includes a sensor that produces a signal indicative that an operator has positioned the portable device proximate a location or component. A record of the signal produced by the sensor is made and is stored within the portable device, providing evidence that the operator was sufficiently close to the location or component to make an inspection of the location or component. In at least some exemplary related embodiments, a token is affixed adjacent to each location on the vehicle where the handheld device is to generate a record providing proof that the handheld device was proximate to that location. The sensor in the handheld device responds to the token to detect when the portable device is proximate to the location. The token causes the signal produced by the sensor to identify the location or component, e.g., a specific tire on a vehicle or a specific component of a system or other apparatus, or a particular location. In some embodiments, the token includes data that are conveyed to the portable device, indicating that remote actuation of a vehicle component proximate to the token is actuatable, such that the portable device will indicate to the user that remote actuation is available. In most applications, a plurality of tokens are provided, each token being associated with and affixed adjacent to a different one of the plurality of components or locations. The token then causes the signal produced by the sensor to identify the location or component when the portable device is proximate to the location or component associated with the token. Also, different predetermined ranges can be specified for the plurality of location or components, so that an appropriate predetermined range can be specified for each location or component.

In an exemplary, but not limiting embodiment, in addition to enabling vehicle components to be remotely actuated, the handheld device is configured to store data indicating a condition of the location or component inspected, in the portable device. After the operator has inspected the location or component, a plurality of different alternative states of the location or component are displayed to the operator, enabling the operator to select the state observed for the location or component during the inspection. If the location or component needs servicing or is unusable, the operator can select one of a plurality of different possible conditions to indicate an observed condition of the location or component relating to servicing the location or component. A data record of the condition selected by the operator is then stored in the portable device. In at least one exemplary embodiment, the handheld device can prompt the user to remotely actuate one or more vehicle components, and indicate a status or condition of each such component. If desired, the portable device can be configured to provide a prompt that indicates the location or component the operator is to inspect, including providing prompts indicating which vehicle components to remotely activate.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the concepts disclosed herein;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected;

Figure 9:
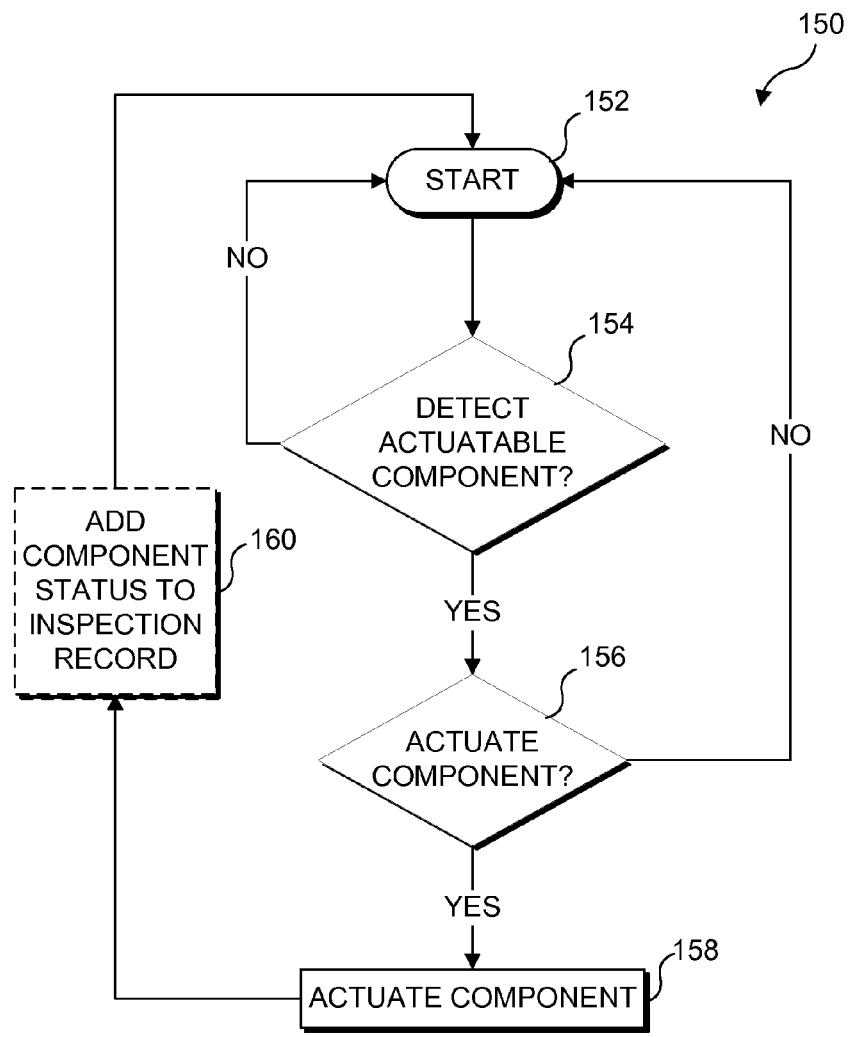
Figure 10:
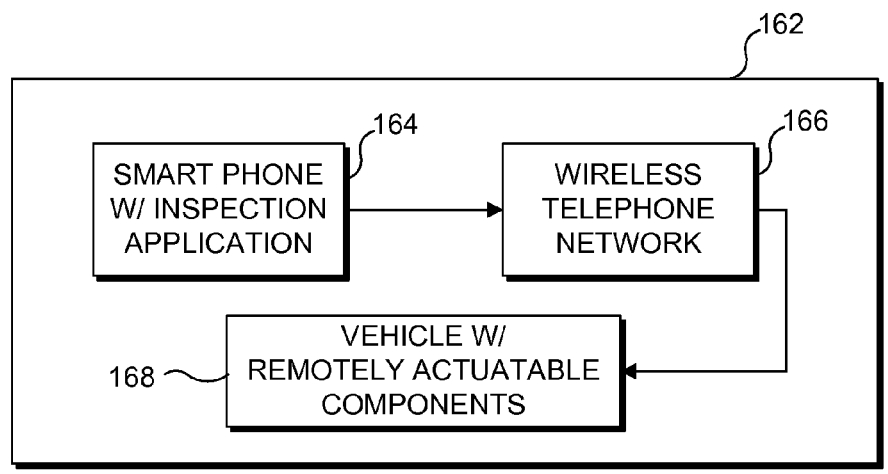

FIG. 9 is a flow chart illustrating exemplary steps employed in using a handheld device both to record inspection data about a vehicle and to remotely actuate a component in the vehicle; and FIG. 10 is a functional block diagram of an exemplary embodiment in which the handheld device is a wireless smart phone, and the wireless connection between the handheld device and the vehicle is based on using a wireless telephone network.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

Overview of the Concepts Disclosed Herein

The concepts disclosed herein encompass a handheld, portable device used to facilitate inspection of vehicles, by wirelessly conveying an activation command to the vehicle to actuate a vehicle component, to facilitate inspection of the actuated component. The activation command is received by a wireless data link in the vehicle, which is logically coupled to at least one of a switch that controls actuation of the component, an actuator configured to manipulate the component, and a vehicle processor configured to selectively convey an actuation command to the component.

In at least one exemplary embodiment, in response to conveying the activation command, the handheld device enables the user to input a condition of the actuated component, which is added to an inspection record. In at least one exemplary embodiment, the handheld device sends a query to the vehicle, the vehicle responds to the query by identifying each component in the vehicle that can be remotely actuated, and the handheld then provides an indication to the user performing the inspection of each component in the vehicle that can be remotely actuated.

In at least one exemplary embodiment, a plurality of tokens are distributed about the vehicle proximate components or locations that should be inspected, each token being detectable by a sensor in the handheld device. Upon detection by the sensor, the tokens will convey information to the handheld device, uniquely identifying the component or location, and when appropriate, indicating that remote actuation of the proximate component is available. The handheld device then provides an indication to the user performing the inspection that the proximate component in the vehicle can be remotely actuated.

Figure 8A:
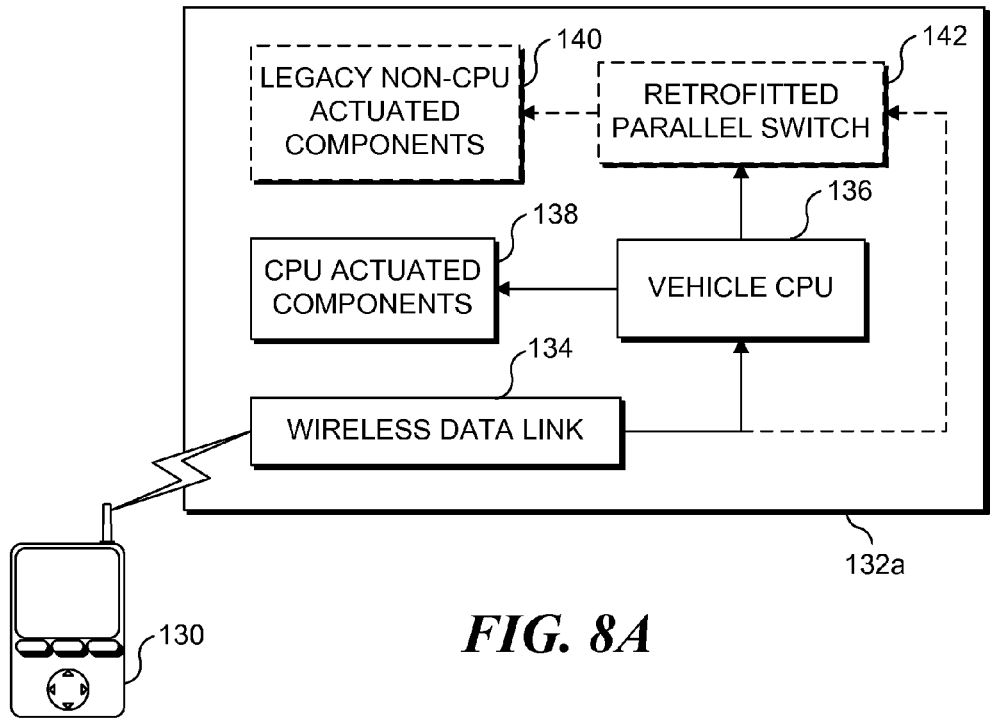
FIG. 8A is a functional block diagram of a first exemplary embodiment where a handheld device used to record inspection data about a vehicle can be used to remotely actuate a component of the vehicle to facilitate its inspection.
Figure 8B:
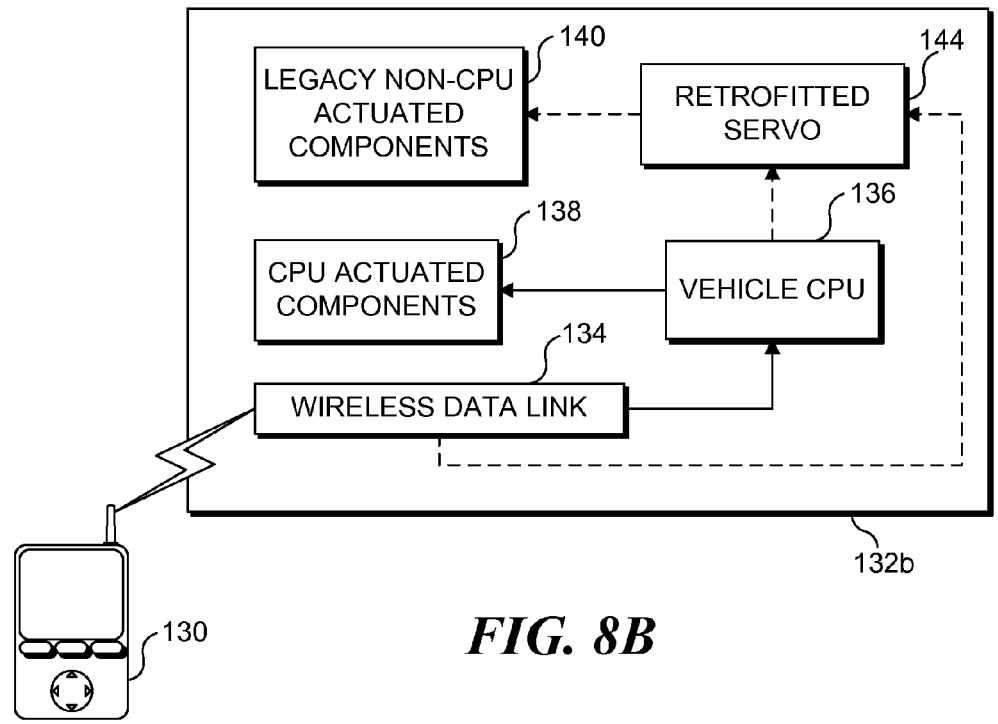
FIG. 8B is a functional block diagram of a second exemplary embodiment where a handheld device used to record inspection data about a vehicle can be used to remotely actuate a component of the vehicle to facilitate its inspection.

Before discussing these concepts in greater detail, an exemplary vehicle inspection system will be disclosed. This exemplary system encompasses FIGS. 1-6. The exemplary system is based on the use of tokens disposed proximate to inspection locations, which enable the handheld device to generate a record providing verification that the user performing the inspection was physically present at such locations (providing evidence that the user performing the inspection was actually proximate the locations to be inspected). It should be understood that while this aspect of the concepts disclosed herein can be beneficially combined with the concept of using a wireless data link in such a handheld device to enable remote actuation of vehicle components during a vehicle inspection, it should be understood that the concepts disclosed herein also encompass embodiments wherein the token functionality is not combined with the remote actuation functionality. FIGS. 8A, 8B and 9 specifically relate to the remote actuation functionality, which can be, but need not be, combined with the token detection functionality. In embodiments not requiring the token detection functionality, the handheld device need not include the sensor for detecting the token, but only a wireless data link and processor configured as discussed below in connection with FIGS. 8A, 8B, and 9.

Token Based Embodiments Providing Evidence of Proximity to Inspected Components

The concepts disclosed herein are applicable in recording data resulting from a safety inspection of almost any type of vehicle and is applicable to other types of inspections in which it is desirable to maintain a data record as evidence that the person making the inspection was actually physically present at a checkpoint or component requiring inspection. While the data accumulated with the concepts disclosed herein are not conclusively presumptive evidence that each component of a system was indeed carefully inspected, in most cases, if a person is required to visit a checkpoint or component, it is very likely that the person will actually inspect the component. By encouraging a person making an inspection to be physically close enough to a component to carry out an inspection, and by providing evidence of that fact in the data recorded, there is at least a justifiable presumption that the person actually did the inspection.

FIG. 1 illustrates a tractor-trailer 10 with which an embodiment of the concepts disclosed herein are usable to carry out a safety inspection. Tractor-trailer 10 is provided with a plurality of tokens affixed adjacent to each checkpoint or component that is to be inspected. While only a few of the tokens are illustrated in FIG. 1, FIG. 7 lists all of the components or systems that should be inspected if a driver is to be in compliance with the DOT regulations regarding pre- and post-inspections of such vehicles. A token will be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection moved sufficiently close to the components being inspected so that the inspection could actually take place is recorded in a portable device 20. Further details of portable device 20 are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all the tires of the tandem dual rear wheels on the left rear of the trailer are readily visible from a position adjacent to token 12, a single token is sufficient to determine that the driver was sufficiently close so that all four tires at the left rear of the trailer could be readily inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent other components of the tractor that are part of the safety inspection. For example, token 26 is affixed adjacent a tire 28 on the right front of the tractor, while tokens 30 and 32 are accessible if the front hood of the tractor is opened and are disposed adjacent the hydraulic brake master cylinder and the engine belts/radiator, respectively (not shown separately).

For each token there is a predetermined maximum distance that portable device 20 can be held from the token that will enable the portable device to detect the token, and thus the component that is associated with it, in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Operator 22 is prompted to approach the next component in a series of components that must be checked during the safety inspection by a message 58 appearing on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16 by producing a signal indicating that the portable device was within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, if during the visual inspection of the tires the operator determines that they require servicing, the operator is prompted to depress a yellow control button 54 on the portable device. Certain conditions such as a tread separation or a nail or other sharp object lodged in the tire would likely lead the person doing the inspection to depress a red control button 56, indicating a safety problem that requires the operator to refer to a supervisor who will likely elect to delay the trip until the tire is repaired and/or replaced or take other appropriate action depending upon the nature of the component and the type of problem that makes the component unsafe to use. Portable device 20 also includes a cursor control 50, which is a four-position switch that enables a cursor (not shown in this Figure) to be moved up or down, and left or right. Cursor control 50, green, yellow, and red control buttons 52, 54, and 56 and display 40 are all disposed on a front surface of a housing 42 of portable device 20. Sensor 46 is disposed on the top edge of housing 42, while an optional universal serial bus (USB) port 48 is disposed on the edge of housing 42, opposite from sensor 46.

An antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, so that the portable device was positioned within the predetermined maximum distance from the token associated with the component, and also indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service and is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

Figure 4:
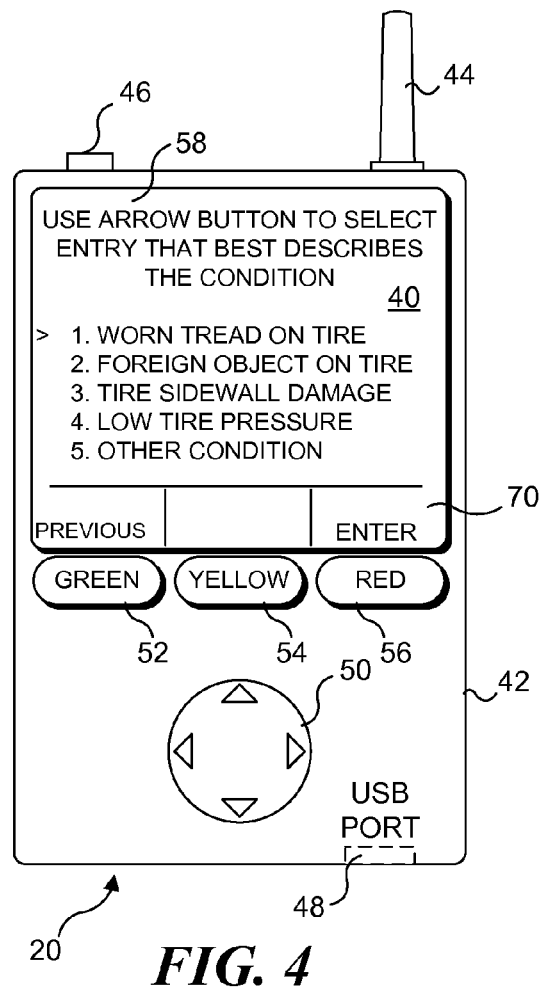
FIG. 4 is a top plan view of the portable device of FIG. 2, illustrating a menu that indicates possible conditions of tires in need of service.

A further example illustrating the selection of a condition relating to the example shown in FIG. 2 is included in FIG. 4. As shown in FIG. 4, if the operator has indicated that the state of the tires is such that they need service by pressing yellow control button 54, portable device 20 automatically displays several possible conditions that would have led an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 61 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select using cursor control 50.

After operator 22 has visited each of the checkpoints required for the safety inspection, the operator can optionally transmit the data that has been collected during the inspection to remote data storage site 61 through a RF transmission via antenna 44. The data provide evidence that the operator has visited the components and indicate the state and condition of the components that were visited and inspected. Alternatively, optional USB port 48 on portable device 20 can be coupled to a network interface 63 on an external cradle (not shown), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost should an accident occur that destroys portable device 20. An accident destroying the evidence that the safety inspection was implemented could have an adverse effect during any litigation related to the accident. However, since the risk of such an accident is relatively remote, it is contemplated that an operator may collect the data from a number of safety inspections in memory 64 and then subsequently upload the data to remote data storage 65 by coupling the device to a cradle (not shown) that includes a USB port terminal and network interface. The cradle might be maintained by a carrier at a freight terminal.

Alternatively, the cradle might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred embodiment, the token that is preferably employed is a radio frequency identification (RFID) tag that is attached with a fastener or an adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON™ chip. The IBUTTON™ chip is programmed with JAVA™ to provide a recognition signal when interrogated by a signal received from a nearby transmitter, such as from antenna 44 on portable device 20. The signal produced by the IBUTTON™ chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width encode light reflected from the bar code tag. The encoded reflected light is received by sensor 46, which is then read by an optical detector. Bar code technology is well understood in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Yet another type of token usable in the concepts disclosed herein is a magnetic strip in which a varying magnetic flux encodes data identifying the particular component associated with the token. Such magnetic strips are often used in access cards that are read by readers mounted adjacent to doors or in an elevator that provides access to a building. However, in the concepts disclosed herein, the magnetic flux reader comprises sensor 46 on portable device 20. The data encoded on such a token is readily read as the portable device is brought into proximity of the varying magnetic flux encoded strip comprising such a token.

As yet another alternative, an active token can be employed that conforms to the BLUETOOTH™ specification for short distance data transfer between computing devices. However, it is likely that the range of the signal transmitted by the token would need to be modified so that it is substantially less than that normally provided by a device conforming to the BLUETOOTH™ specification. It is important that the portable device be able to detect that it is proximate to the component only within a predetermined maximum range selected to ensure that the operator is positioned to actually carry out an inspection of the component.

Logical Steps Implemented in the Concepts Disclosed Herein

Figure 5:
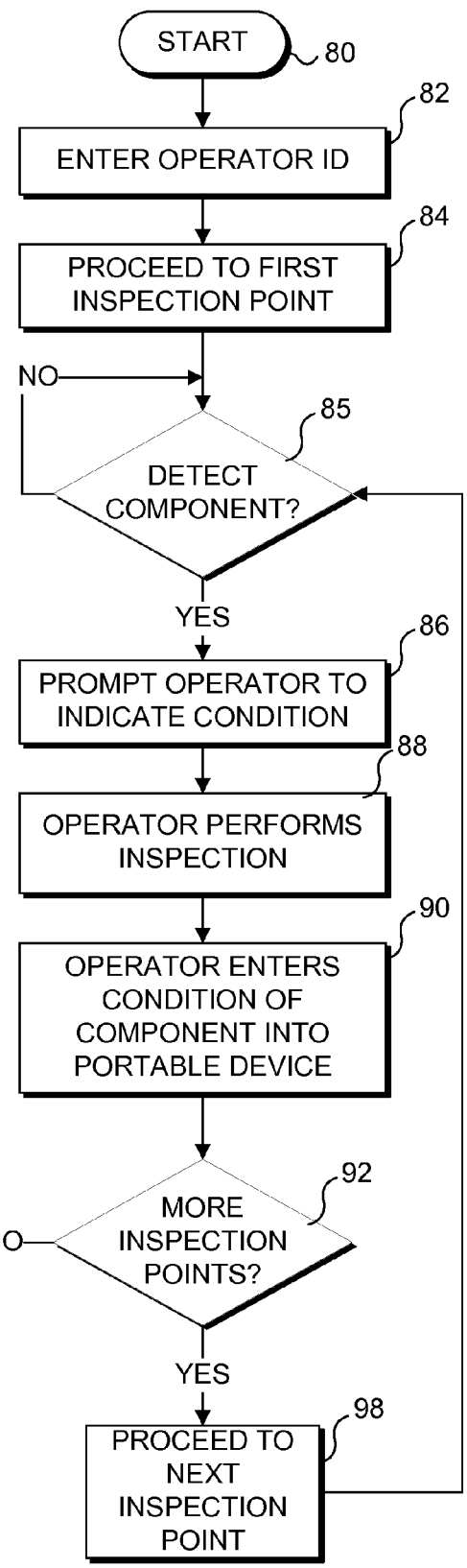
FIG. 5 is a flow chart showing the steps followed in carrying out a safety inspection in accord with the concepts disclosed herein.

FIG. 5 illustrates the logical steps implemented in connection with the concepts disclosed herein to carry out a safety inspection of a vehicle or other apparatus or system. From a start block 80, a step 82 provides for manual entry of an operator identification (ID) into a data record, or the operator ID can already be stored in the memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point, as indicated in a step 84. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of steps might be required to test the component to determine if it is operating properly, needs maintenance or repair, or is unusable. Again, portable device 20 can be programmed to provide appropriate prompts to direct the operator through a series of steps required to carry out the inspection of such a component. Accordingly, in a step 90 the operator selectively enters the condition of the component into portable device 20 using the control buttons and cursor control 50.

A decision step 92 determines if there are further inspection points in the safety inspection being carried out. If not, a step 94 provides for transmitting or loading the inspection data into storage at a remote site; this step can be done immediately after the inspection is completed, or at some later time, perhaps after additional safety inspections have been completed. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
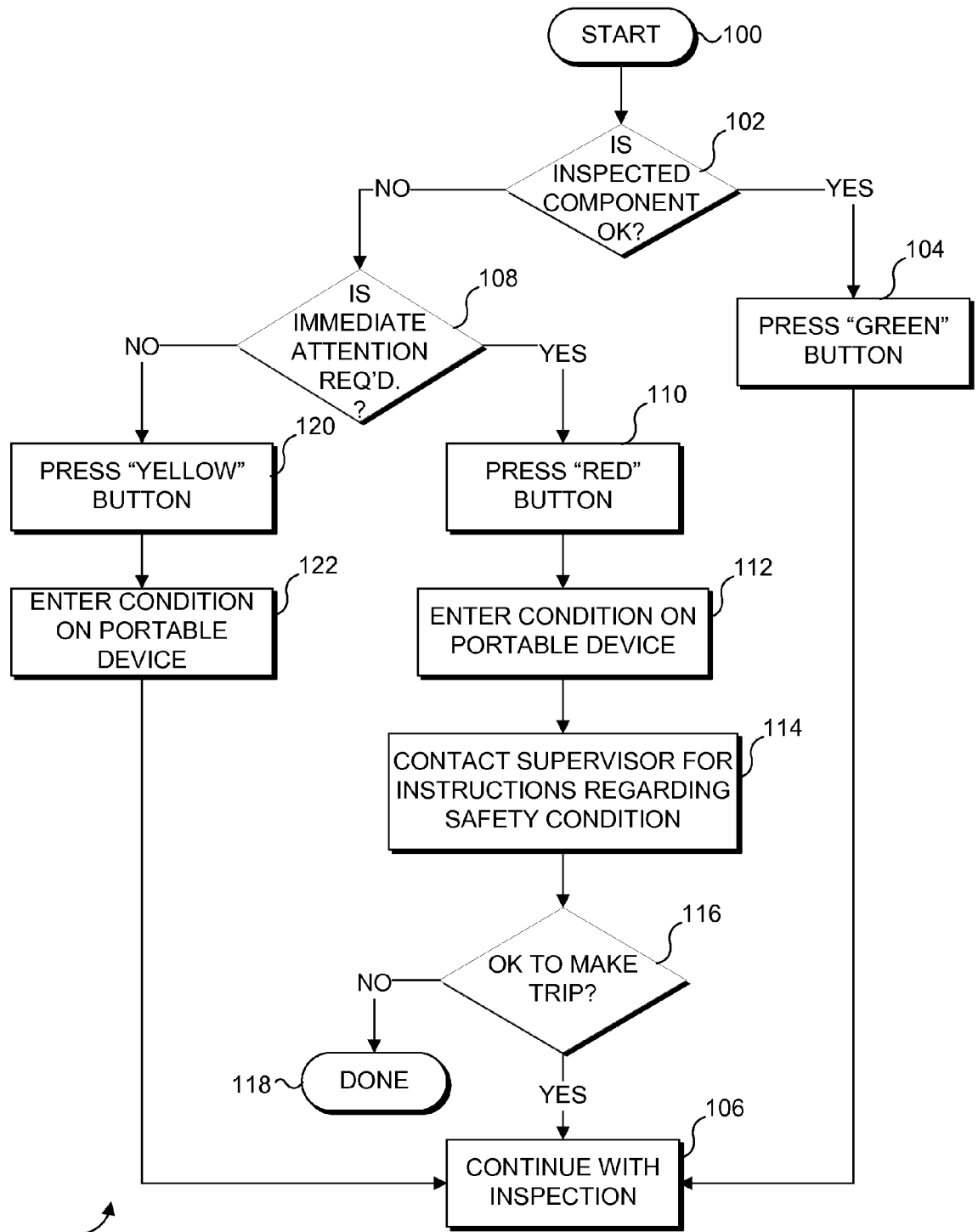
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, and the tire should not be used, but should instead be replaced, the operator would use the cursor control on the portable device to select an option for the condition "tread separating from tire" at a step 112. In most inspections, the operator would be required to contact a supervisor for instructions regarding the safety condition at a step 114. In the example just noted, the supervisor would likely arrange for the tire to be replaced by maintenance or repair personnel.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, five possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative to Portable Device

While it is likely that an initial preferred embodiment will employ portable device 20, it is also contemplated that an accessory might be provided for a personal digital assistant (PDA), such as the PALM™ PDA, which would enable the PDA to be used for the same functions as portable device 20. The accessory to the PDA will include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by portable device 20, as described above.

Exemplary Embodiments for Remote Actuation of a Vehicle Component

As discussed above, the concepts disclosed herein encompass an exemplary handheld, portable device used to facilitate inspection of vehicles, by wirelessly conveying an activation command to the vehicle to actuate a vehicle component, so as to facilitate inspection of the vehicle component. The activation command is received by a wireless data link in the vehicle, which is logically coupled to at least one of a switch that controls actuation of the component, an actuator configured to manipulate the component, and a vehicle processor configured to selectively convey an actuation command to the component or directly actuate the component.

The handheld device employed in this exemplary embodiment can be based on that shown in FIG. 2, though it should be recognized that the component sensor element is not required in all embodiments that enable remote actuation of vehicle components. Furthermore, in some exemplary embodiments encompassed herein, rather than using a display to output data to an operator, the handheld device enabling remote actuation of vehicle components uses lights or sound (including but not limited to spoken audible prompts) in place of a display. Thus, it should be recognized that with respect to the remote actuation embodiment, the handheld device in FIG. 2 is simply exemplary, and not limiting. Many other types of handheld devices can be employed, so long as the handheld device includes a wireless data link configured to convey an actuation command to the vehicle to activate a component that can be remotely actuated, and a memory in which data corresponding to a condition of one or more components on the vehicle are stored.

Several techniques can be used to identify vehicle components that can be remotely activated. In at least one exemplary embodiment, the handheld device enables the user to indentify a particular vehicle component for which inspection data will be input into the handheld device. If remote activation of the identified component is available and appropriate to complete an inspection, the handheld device can be configured to output an indication to the user that remote activation of that component can be carried out. The output can be in the form of an audible signal, a visual signal presented on a display, or a simpler visual output that uses one or more light sources.

In at least one exemplary embodiment, the handheld device is configured to prompt the user to inspect a plurality of specific vehicle components (either in a specified order, or in an order of the user's choosing). The handheld device can be configured to output an indication to the user that remote activation of specific components is available. The output can be in the form of an audible output, a visual output presented on a display, or a simpler visual output using one or more light sources.

In at least one exemplary embodiment, the handheld device is configured to send a query to the vehicle being inspected, requesting that the vehicle identify each vehicle component that can be remotely activated. The handheld device can then output an indication to the user that remote activation of specific components is available. The output can be in the form of an audible output, a visual output presented on a display, or a simpler visual output using one or more light sources. In an exemplary but not limiting embodiment, the query from the handheld device to the vehicle is sent when the user begins the inspection or at some appropriate point in the inspection.

In at least one exemplary embodiment, a plurality of tokens are distributed about the vehicle proximate to components or locations that should be inspected, and each token is detectable by a sensor in the handheld device. Upon detection by the sensor, the token can convey information to the handheld device, uniquely identifying the component or location, and when appropriate, indicating that remote actuation of a component proximate to the token is available. The handheld device can then provide an indication to the user performing the inspection that the component in the vehicle proximate the detected token can be remotely actuated. The output can be in the form of an audible output, a visual output presented on a display, or a simpler visual output using one or more light sources.

In at least one exemplary embodiment, in response to conveying the activation command, the handheld device enables the user to input a condition of the actuated component, which is added to an inspection record.

FIG. 8A is a functional block diagram of a first exemplary embodiment where a handheld device used to record inspection data about a vehicle can be used to remotely actuate a component of the vehicle to facilitate its inspection. A portable handheld device 130 includes a wireless data link configured to convey an actuation command to a vehicle 132a, which includes a component that can be remotely actuated. Handheld device 130 also includes a memory in which data corresponding to a condition of the vehicle are stored, a wireless data link enabling component activation instructions to be conveyed to the vehicle being inspected, and either machine instructions and a processor, or a hardware-based controller, for implementing the functions of recording inspection data and remotely activating vehicle components. Vehicle 132a includes a wireless data link 134 (configured to wirelessly communicate with handheld device 130; in an exemplary but not limiting embodiment, handheld device 130 can wirelessly communication with vehicle 132a at distances up to about 50 to about 100 feet). Vehicle 132a includes a processor 136 that is coupled to wireless data link 134 and at least one vehicle component 138, each of which is configured to be actuated by a signal received from processor 136 (in the context of aircraft, such actuation is referred to as fly-by-wire, where the actuation is based on an electrical connection between a user input, a controller, an actuator, and the component to be actuated, as opposed to a direct mechanical or hydraulic linkage between a user input control handle or pedal and the component to be actuated).

To activate a specific component 138, handheld device 130 can use its wireless data link to convey an activation command to vehicle 132a. The activation command is received by wireless data link 134, which is logically coupled to processor 136. It should be noted that some vehicles, particularly those with a plurality of fly-by-wire type components, may include more than one processor 136. In such embodiments, each processor controlling a different remotely actuatable component will typically be logically coupled to wireless data link 134 (each processor could instead use a separate data link, but that approach would require installing more wireless data links in the vehicle). Where the controller can be used to remotely actuate different components, the activation command from the handheld device will include an identification (ID) component specifying the component (or components) that are to be activated. If a plurality of components are to be activated, the handheld device can send a plurality of different activation commands, or a single command that includes ID elements for each component to be activated, and if desired or appropriate, can indicate a sequence defining an order in which the plurality of components are to be actuated in succession.

Note that to enable remote actuation of components 138 (i.e., fly-by-wire type components), relatively few changes to a vehicle may be required. If the vehicle does not already include a wireless data link, or if the wireless data link is not logically coupled to the appropriate vehicle controller(s), then such a data link/logical connection can be provided to facilitate the present novel approach. Firmware or software modifications may be required to enable the vehicle processor to recognize activation commands sent by the handheld device and received by the vehicle's data link. However, most vehicle controllers in current vehicles are already configured to receive updated instruction sets for controlling vehicle operation, so such software/firmware changes are relatively routine and readily implemented.

Referring again to FIG. 8A, vehicle 132a can also include certain components 140 where vehicle inspections would benefit from enabling such components to be remotely actuated during an inspection, but the components are not originally configured to be actuated via a logical command from a controller (i.e., such components are not configured for fly-by-wire actuation). Components of this type are referred to herein and in the claims that follow as "legacy components." In at least one embodiment encompassing the concepts disclosed herein, such legacy components can be remotely actuated by adding an electronically controlled switch 142 that is logically coupled to the component. In FIG. 8A, this electronically controlled switch is referred to as a "parallel switch," in that it will often be installed in parallel with an existing user actuatable conventional switch in the vehicle that is used to manually control that component. For example, a loading arm (such as those used by garbage trucks to manipulate garbage containers) is generally activated by a user controlled switch or joystick in the vehicle.

Several techniques can be used to enable remote actuation of such a legacy component. As indicated in FIG. 8A, a new electronically controlled switch (i.e., switch 142) is installed in the vehicle, in parallel with the conventional manually actuated switch. An output of the electronically controlled switch is logically coupled to the component to be activated (or to an actuator that is normally controlled by the conventional manual switch). An input to the electronically controlled switch is electrically coupled to either vehicle controller 136 or wireless data link 134, so that a wireless activation command from the handheld device used to perform the inspection can be received and then cause electronic switch 142 to be activated, which produces the same result as closing the conventional manually activated switch that connected in parallel with electronic switch 142. Electronic switch 142 can be installed anywhere in the vehicle, so long as the appropriate electrical/logical connections are made to achieve the above-described functionality. In many embodiments, the switch will simply be sending on/off commands to the component (or an actuator for the component). Some components (such as a loading arm, particularly an articulated loading arm with multiple degrees of freedom), may require more complicated actuation commands. So long as the handheld device used to perform the inspection has a user interface that can generate the required actuation commands, those actuation commands can be wirelessly conveyed to the vehicle to enable actuation of the component by activating add-on electronic switches installed in parallel with the conventional manually activated switch or controls on the vehicle. User interfaces commonly found in video game controllers enable very complicated actuation commands to be generated using buttons, and such button configurations can be easily provided on the handheld device. A joystick could also be implemented on the handheld device, though buttons would yield a more compact form factor likely to be favored by users.

While FIG. 8A has been discussed in context of adding an additional electronic switch in parallel with an existing manually controlled switch used to control component 140, it should be recognized that in some vehicles, it may be feasible to simply logically couple an existing switch to the vehicle processor or wireless data link to receive remote commands from the handheld device. Use of this option will be a function of the design of the original switch, and whether the original switch can receive an additional input signal from a different source (i.e., from the vehicle processor or the wireless data link, as opposed to receiving an input signal from an operator interface, such as a button, previously installed in the vehicle).

FIG. 8B is a functional block diagram of a second exemplary embodiment where a handheld device used to record inspection data for a vehicle can be used to remotely actuate a component of the vehicle to facilitate the inspection of component. The embodiment of FIG. 8B differs from that discussed above, in that a vehicle 132b is modified to include a servo 144 configured to actuate legacy component 140. Some vehicle components are operated by switches or buttons, and often such switches or buttons can be configured to receive an input from the vehicle processor or the data link as discussed above, or a parallel electronic switch can be added and its input can be electronically/logically coupled to the vehicle processor or the data link to enable remote actuation of the component. However, some vehicle components, such as a vehicle's braking system, have user interfaces where a servo or some other prime mover or force actuator may be required to reproduce a mechanical force that emulates the force normally exerted by a vehicle operator. If one simply wants to test that brake lamps are functional, then a voltage can be sent to the brake lamp via an additional circuit (i.e., electronic switch 142) or through the existing circuit based on an activation command originating in the handheld device, generally as discussed above. However, to fully test the braking system, so as to verify that the brake lamps are energized when pressure is applied to a brake pedal in the vehicle, then a servo or other force actuator could be added to the vehicle to enable the mechanical force applied to the brake pedal by an operator to instead be applied automatically by the server or force actuator. The servo or other type of force actuator is electronically/logically coupled to either processor 136 or data link 134, to enable activation of the servo (and the component it is configured to engage) in response to a command sent from the handheld device used to conduct the inspection of the vehicle. It should be recognized that such servos or other type of force actuator can be used to actuate components other than a brake pedal, and that the brake pedal embodiment is simply exemplary, and not limiting.

FIG. 9 is a flow chart 150 illustrating exemplary steps employed in using a handheld device both to record inspection data for a vehicle and to remotely actuate a component in the vehicle, to facilitate the inspection. It should be understood that the method steps discussed in connection with FIG. 9 are exemplary of but a single embodiment and other logical steps that could be used to implement remote activation of vehicle components during an inspection. Accordingly, such steps should not be considered to be the only logical steps that can be employed to achieve the novel approach described herein.

In FIG. 9, after a start block 152, a determination is made in a decision block 154 as to whether any activatable components have been detected by the portable device used to perform the inspection. In some embodiments, the portable device includes a sensor configured to detect a token proximate a component or location on a vehicle that should be inspected. The token can be configured to convey data to the handheld device when the token is read, to indicate that a component in vicinity of the token can be remotely actuated. In a different embodiment, whenever the handheld device (i.e., the portable device used to perform the inspection) and the vehicle are within range, the vehicle broadcasts to the handheld device a list of components that can be remotely actuated (thus, the "detection" in block 154 refers to the handheld device receiving such a list). In some embodiments, the handheld device must specifically send a query to the vehicle to receive such a list. The query can be sent to the vehicle based on any of a number of parameters, including but not limited to a user input specifically requesting such a list, or a user input of data indicating that an inspection is being performed.

If, in decision block 154 no actuatable components are detected, the logic loops back to start block 152 and then back to decision block 154, until an actuatable component is detected, at which point the logic determines whether the detected component should be actuated in a decision block 156. If desired, decision block 156 can be eliminated, such that any detected component is automatically actuated. However, it is likely the person performing the vehicle inspections discussed herein will desire the ability to affirmatively determine if actuation is desired or not, and may want to control when the component is actuated. Handheld devices for storing data about a vehicle inspection and remotely actuating a vehicle component can be configured to receive input from a user about whether and when a detected component should be actuated in a variety of ways. Handheld devices, such as the example shown in FIG. 2, include a variety of user input elements that a user can employ to make selections and input commands. In embodiments where a list of actuatable components is displayed to the user, the user can use such input elements to make a selection of one or more of the displayed vehicle components that should be remotely actuated. In embodiments where only a single actuatable component is detected at a given time (such as the token embodiment where data regarding an actuatable component proximate to a token is conveyed to the handheld device when the token is read), the user can use such input elements to indicate whether the detected component should be actuated (and control when it actuated). If desired, handheld devices that can respond to voice commands from a user can be provided.

If, in decision block 156, actuation of a detected component is not to be implemented, the logic loops back to start block 152 and then back to decision block 154, until an actuatable component is detected that might be actuated, at which point the logic determines whether the detected component should be actuated in decision block 156.

If, in decision block 156, actuation of a detected component is to be implemented, the handheld device sends an activation command to the vehicle in a block 158, using the wireless data link in the handheld device, as discussed above. In an optional block 160, a record that the detected component was actuated for inspection purposes is automatically added to a memory in the handheld device. In some embodiments, the user of the handheld device is prompted to add details about a condition of the inspected component to the record. The logic then loops back to start block 152 and then back to decision block 154, until an actuatable component is detected, at which point the logic determines whether the detected component should be actuated in decision block 156.

FIG. 10 is a functional block diagram 160 of an exemplary embodiment in which the handheld device is a wireless smart phone 164, and the wireless connection between the handheld device and a vehicle 168 (which includes remotely actuatable components, generally as discussed above) is based on using a wireless telephone (or cell) network 166. In such an embodiment, the wireless network acts as an intermediary communication link between the handheld and the vehicle. Smart phone 164 can include an inspection application for generating and storing inspection records, as well as for remotely actuating components in vehicle 168, as discussed above.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for performing a vehicle inspection, comprising the steps of:
    (a) providing:
        (i) a vehicle including at least one vehicle component configured to be remotely actuated, and a wireless data link component for wirelessly receiving an actuation command to remotely actuate the at least one vehicle component; and
        (ii) a portable device for recording data related to the inspection, said portable device including a wireless data link component configured to wirelessly convey an actuation command to the vehicle to remotely actuate the at least one vehicle component to facilitate an inspection of the vehicle; and
    (b) enabling an operator to use the portable device to remotely actuate the at least one vehicle component during the vehicle inspection, and to record data corresponding to a condition of the vehicle;
    (c) in response to remotely actuating the vehicle component, displaying to the operator a plurality of different possible conditions associated with the vehicle component;
    (d) enabling the operator to select one of the plurality of different possible conditions, to indicate a condition associated with the component as determined by the operator; and
    (e) storing in the portable device a record of said one of the plurality of different possible conditions selected by the operator.

2. The method of claim 1, wherein the step of enabling the operator to use the portable device to remotely actuate the at least one vehicle component during the vehicle inspection comprises the steps of:
    (a) detecting a vehicle component that can be remotely actuated by the portable device;
    (b) providing an indication to the operator that the vehicle component detected is capable of remote actuation; and
    (c) enabling the operator to selectively actuate the vehicle component detected using the portable device.

3. The method of claim 2, wherein the step of using the portable device to detect the vehicle component that can be remotely actuated by the portable device comprises the step of placing the portable device sufficiently close to the vehicle component such that the portable device can detect the vehicle component is capable of remote actuation, the detection by the portable device that the vehicle component is capable of remote actuation occurring being a function of a distance between the portable device and the vehicle component.

4. The method of claim 1, wherein the step of enabling the operator to use the portable device to remotely actuate at least one vehicle component during the vehicle inspection comprises the steps of:
    (a) using the data link component in the portable device to convey a query to the vehicle, requesting the vehicle to identify each vehicle component that can be remotely actuated by the portable device;
    (b) receiving from the vehicle data identifying each vehicle component that can be remotely actuated by the portable device;
    (c) providing an indication to the operator of the portable device that remote actuation of each vehicle component identified in the data is possible; and
    (d) enabling the operator to selectively actuate any vehicle component identified in the data using the portable device.

5. The method of claim 1, wherein the step of enabling the operator to use the portable device to remotely actuate at least one vehicle component during the vehicle inspection comprises the steps of:
    (a) providing an indication to the operator that remote actuation of at least one of a plurality of vehicle components is possible; and
    (b) enabling the operator to selectively actuate the at least one of the plurality of vehicle components indicated using the portable device.

6. The method of claim 1, wherein the step of enabling an operator to use the portable device to remotely actuate at least one vehicle component during the vehicle inspection comprises the steps of:
    (a) using the wireless data link component in the portable device to wirelessly convey an actuation command from the portable device to the wireless data link in the vehicle;
    (b) receiving the actuation command at the, wireless data link component in the vehicle;
    (c) conveying the actuation command from the wireless data link component in the vehicle to the vehicle component to be actuated; and
    (d) receiving the actuation command at the vehicle component to be actuated, and in response, actuating said vehicle component.

7. The method of claim 1, wherein the step of enabling an operator to use the portable device to remotely actuate at least one vehicle component during the vehicle inspection comprises the steps of:
    (a) using the wireless data link component in the portable device to wirelessly convey an actuation command from the portable device to the wireless data link component in the vehicle;
    (b) receiving the actuation command at the wireless data link component in the vehicle;
    (c) conveying the actuation command from the wireless data link component in the vehicle to a vehicle processor configured to selectively actuate the vehicle component to be actuated; and (d) receiving the actuation command at the vehicle processor, thereby causing the vehicle processor to actuate said vehicle component.

8. The method of claim 1, wherein the step of enabling an operator to use the portable device to remotely actuate at least one vehicle component during the vehicle inspection comprises the steps of:
 (a) using the wireless data link component in the portable device to wirelessly convey an actuation command from the portable device to the wireless data link component in the vehicle;
 (b) receiving the actuation command at the wireless data link component in the vehicle; and
 (c) conveying the actuation command from the wireless data link component in the vehicle to an actuator configured to selectively actuate the vehicle component to be actuated, thereby causing the actuator to actuate the vehicle component.

9. The method of claim 1, wherein the at least one vehicle component is selected from a group consisting of:
 (a) a brake light;
 (b) a turn signal;
 (c) a headlight;
 (d) an emergency flasher;
 (e) a horn;
 (f) a legacy component not normally actuated by a vehicle processor; and
 (g) ancillary equipment for the vehicle.

10. A memory medium having machine instructions stored thereon for facilitating an inspection of a vehicle, the machine instructions, when implemented by a processor, further carry out the functions of:
 (a) using a wireless data link component in a portable device that is employed to conduct the vehicle inspection to wirelessly convey an actuation command to remotely actuate a component in the vehicle, thereby facilitating inspection of that component;
 (b) using the wireless data link component in the portable device to wirelessly convey a query to the vehicle, requesting the vehicle to identify each component that can be remotely actuated by the portable device;
 (c) providing an indication to the operator that remote actuation of each component identified is possible;
 (d) enabling the operator to selectively actuate any component identified, using the portable device, by wirelessly conveying to the vehicle the actuation command that corresponds to each component selected to be actuated; and
 (e) generating an inspection record in the portable device that includes an identity of the component that was remotely activated.

11. A memory medium having machine instructions stored thereon for facilitating an inspection of a vehicle, the machine instructions, when implemented by a processor, carrying out the functions of:
 (a) using a wireless data link component in a portable device that is employed to conduct the vehicle inspection to wirelessly convey an actuation command to remotely actuate a component in the vehicle, thereby facilitating inspection of that component;
 (b) in response to remotely actuating the vehicle component, displaying to the operator of the portable device a plurality of different possible conditions associated with the component;
 (c) enabling the operator to select one of the plurality of different possible conditions, to indicate a condition associated with the component as determined by the operator; and
 (d) generating an inspection record in the portable device that includes an identity of the component that was remotely activated, and including in the inspection record said one of the plurality of different possible conditions selected by the operator.

12. A memory medium having machine instructions stored thereon for facilitating an inspection of a vehicle, the machine instructions, when implemented by a processor, carrying out the functions of:
 (a) using a wireless data link component in a portable device that is employed to conduct the vehicle inspection to detect a component that can be remotely actuated by the portable device;
 (b) providing an indication to the operator that the component detected is capable of remote actuation;
 (c) enabling the operator to selectively actuate the component detected using the portable device, by conveying to the vehicle the actuation command corresponding to the component that was detected; and
 (d) generating an inspection record in the portable device that includes an identity of the component that was remotely activated.

13. A portable device for facilitating a vehicle inspection, comprising:
 (a) a housing;
 (b) an output for providing at least one of a visual indication and an audible indication to a user of the portable device;
 (c) an operator interface;
 (d) a wireless data link component configured to wirelessly communicate with a corresponding wireless data link component in a vehicle to be inspected;
 (e) a memory in which machine instructions and data are stored; and
 (f) a controller coupled to the output, the memory, and the operator interface, said controller executing the machine instructions to enable the operator to:
  (i) use the portable device to remotely actuate at least one vehicle component during the vehicle inspection, by sending an actuation command to the vehicle using the wireless data link component in the portable device; and
  (ii) use the operator interface in the portable device to record data in the memory of the portable device corresponding to a condition of the vehicle.

14. The portable device of claim 13, wherein the machine instructions, when implemented by the processor, further carry out the functions of:
 (a) using the wireless data link component in the portable device to convey a query to the vehicle, requesting the vehicle to identify each vehicle component that is capable of being remotely actuated by the portable device;
 (b) using the output to provide an indication to the operator of each vehicle component identified as being capable of remote actuation; and
 (c) enabling the operator to selectively actuate any vehicle component identified, using the portable device.

15. The portable device of claim 13, wherein the portable device further comprises a sensor capable of detecting a token that is proximate to a vehicle component to be inspected, and wherein the machine instructions, when implemented by the processor, further carry out the functions of:

(a) using the sensor in the portable device to detect a token that is proximate to a vehicle component that can be remotely actuated by the portable device;

(b) providing an indication to the operator that the vehicle component proximate to the token detected is capable of remote actuation; and (c) enabling the operator to selectively actuate the vehicle component that is proximate to the token detected using the portable device, by conveying to the vehicle the actuation command corresponding to said vehicle component.

16. The portable device of claim 15, wherein the machine instructions, when implemented by the processor, further carry out the functions of causing the memory to store a record indicative of each token visited during the inspection, in response to a signal produced by the sensor, such that whenever the sensor produces the signal indicating that the portable device is proximate to one of a plurality of tokens at a different location on the vehicle, the machine instructions executed by the processor further causing a plurality of different possible conditions associated with the location to be presented to the operator on the display, a condition selected by the operator from the plurality of different possible conditions being added to the record for that location.

17. The portable device of claim 13, wherein the machine instructions, when implemented by the processor, further carry out the functions of:

(a) in response to remotely actuating the vehicle component, displaying to the operator of the portable device a plurality of different possible conditions associated with the vehicle component;

(b) enabling the operator to select one of the plurality of different possible conditions, to indicate a condition associated with the vehicle component as determined by the operator; and (c) storing in the portable device a record of said one of the plurality of different possible conditions selected by the operator.

18. A system for facilitating a vehicle inspection, comprising:

(a) a vehicle to be inspected, the vehicle comprising:
  (i) a component that can be remotely actuated; and
  (ii) a wireless data link component configured to wirelessly communicate with a portable device used in the inspection, the wireless data link component being logically coupled to at least one of the following:
    (A) a switch that controls the remotely actuatable component;
    (B) an actuator configured to manipulate the remotely actuatable component; and
    (C) a vehicle controller logically coupled to the remotely actuatable component, and configured to convey an actuation command to the remotely actuatable component in response to actuation instructions received through the wireless data link; and (b) a portable device adapted to be transported to each location to be visited and inspected during the vehicle inspection, said portable device including:
  (i) a housing;
  (ii) an output for providing at least one of a visual output and an audible output to a user of the portable device;
  (iii) an operator interface;
  (iv) a wireless data link component configured to wirelessly communicate with the wireless data link component in the vehicle to be inspected;
  (v) a memory in which machine instructions and data are stored; and
  (vi) a controller coupled to the output, the memory, and the operator interface, said controller executing the machine instructions and enabling the operator to:
    (A) use the portable device to remotely actuate the vehicle component that can be remotely actuated, by sending the actuation instructions to the vehicle using the wireless data link component in the portable device; and
    (B) use the operator interface in the portable device to record data in the memory of the portable device corresponding to a condition of the vehicle.

* * * * *